United States Patent [19]

Mendelsohn et al.

[11] 4,335,179
[45] Jun. 15, 1982

[54] IMPREGNATED HIGH VOLTAGE SPACERS

[75] Inventors: Morris A. Mendelsohn, Wilkins Township, Allegheny County; Francis W. Navish, East Pittsburgh, both of Pa.

[73] Assignee: Westinghouse Electric Corp., Pittsburgh, Pa.

[21] Appl. No.: 230,489

[22] Filed: Feb. 2, 1981

[51] Int. Cl.³ ............................................. B32B 7/00
[52] U.S. Cl. .................................. 428/273; 174/209; 310/260; 428/280; 428/290; 428/417; 428/320.2; 528/89; 528/91
[58] Field of Search .............. 428/273, 280, 290, 304, 428/417; 528/89, 91; 174/209; 310/260, 271

[56] References Cited

U.S. PATENT DOCUMENTS

| 2,427,700 | 9/1947 | Atkinson et al. | 174/103 |
| 4,273,914 | 6/1981 | Smith et al. | 528/89 |
| 4,297,606 | 10/1981 | Wichmann | 310/271 |

FOREIGN PATENT DOCUMENTS 612377 1/1961 Canada.

Primary Examiner—James J. Bell
Attorney, Agent, or Firm—D. P. Cillo

[57] ABSTRACT

A resin impregnated spacer, useful for bracing electrical conductors, comprises a porous, flexible, heat resistant material impregnated with an epoxy resin containing Lewis acid curing agent and an effective amount of dibutylphosphite.

12 Claims, 2 Drawing Figures

IMPREGNATED HIGH VOLTAGE SPACERS

BACKGROUND OF THE INVENTION

Support systems for stator end windings of turbine generators must absorb vibration. The support system must control the forces which result from both steady-state and short-circuit conditions, and also allow controlled axial notion for thermal expansion. Atkinson et al., in U.S. Pat. No. 2,427,700, taught resin impregnated spacer blocks between adjacent end windings, to prevent end winding movement relative to one another during generator operation. The spacer blocks were made from a fibrous material, such as asbestos cloth, impregnated with a carbon filled phenolic resin.

Since the time of Atkinson et al., epoxy resins have come into popular use as insulation in electrical apparatus. However, no resin system has yet been found for bracing stator end windings which combines the features of low toxicity, low initial viscosity, and cure to give a heat distortion temperature of at least 100° C. Other useful and advantages characteristics needed by this specialized system include: a room temperature gel time of between 40 to 90 minutes to allow adequate working time, low shrinkage, and good thin film drying characteristics at room temperature. It is essential that the resin film completely dry within at least 36 hours at up to 75% Relative Humidity, so that dust will not adhere to the end windings at the resin surface and cause an increase of surface conductivity.

SUMMARY OF THE INVENTION

The above problems have been solved and the above needs met, by providing a low viscosity impregnating resin which can be used with a heat resistant, flexible, absorbent substrate, to provide stator end winding spacers. The impregnating resin comprises (A) 100 parts by weight of an epoxy resin system having an initial viscosity at 25° C. of up to about 6,000 cps.; where said epoxy resin system may contain up to about 10 parts by weight of low viscosity epoxy reactive diluent, (B) about 2 parts by weight to about 8 parts by weight of a Lewis acid curing agent, and (C) about 0.3 parts by weight to about 7 parts by weight of dibutylphosphite.

This resinous composition has low toxicity and can be impregnated into fibrous substrates, such as porous, heat resistant felt pads, for use as spacing braces between electrical conductors. The resinous composition will cure at room temperature with low shrinkage, to provide a cured, strong, rigid system, having heat distortion temperatures of over 100° C. The resinous composition will also dry as a thin film at 25° C. within 36 hours at 75% Relative Humidity. They can also be post cured by heating, to give even more improved strength and anti-creep properties.

BRIEF DESCRIPTION OF THE DRAWING

For a better understanding of the invention, reference may be made to the exemplary embodiments shown in the accompanying drawings in which.

DESCRIPTION OF THE PREFERRED EMBODIMENTS

Figure 1:
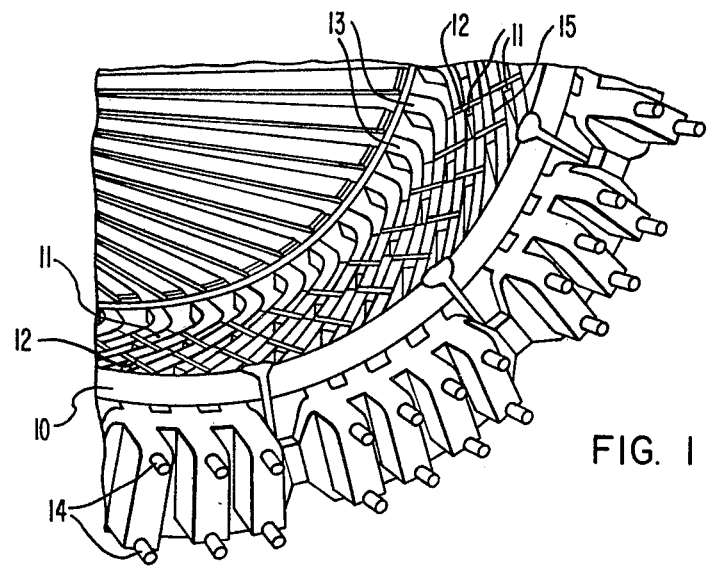
FIG. 1 shows a pictorial view of one embodiment of a portion of the end winding bracing system for water cooled stator coils in a turbine generator.

The impregnating resin of this invention comprises 100 parts by weight of an epoxy resin system having an initial viscosity at 25° C. of up to about 6,000 cps., preferably between 500 cps. and 4,500 cps. The epoxy resin system is preferably a two component system, the base resin of which is a diglycidyl ether of bisphenol A type, which may be represented by the chemical structural formula:

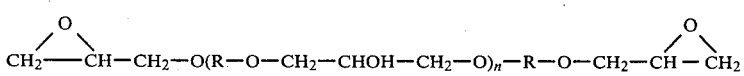

where n is an integer of the series 0, 1, 2, 3 . . . , and R is:

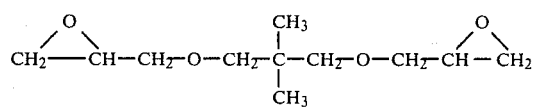

This base epoxy resin can have a viscosity at 25° C. of up to about 16,000 cps., preferably between 4,000 to 6,000 cps., and is usually diluted with an amount of a second component low viscosity diluent epoxy effective to lower the epoxy viscosity. Epoxy systems with viscosities over about 6,000 cps. will be difficult to impregnate into felt or other suitable substrates. Thus, the term "epoxy resin system", as used herein, means a base epoxy resin plus possible minor amounts of diluent epoxy resin. Such system could consist solely of low viscosity bisphenol A epoxy resin.

The epoxy resin system may contain up to about 10 parts by weight, of the 100 parts total epoxy, of a low viscosity reactive diluent epoxy resin having a viscosity at 25° C. of between about 5 cps. and 100 cps., such as, preferably, the diglycidyl ether of neopentyl glycol (DGENPG), which may be represented by the chemical structural formula:

$$CH_2-\!\!\!-\!\!\!-CH-CH_2-O-CH_2-\underset{\underset{CH_3}{|}}{\overset{\overset{CH_3}{|}}{C}}-CH_2-O-CH_2-CH-CH_2$$

A typical epoxy resin system would consist of, for example, 95 parts by weight bisphenol A epoxy and 5 parts by weight DGENPG. The reactive diluent epoxy is effective to dilute the base epoxy and to prevent epoxy from crystallizing during storage. Use of over about 10 parts by weight of epoxy diluent per 100 parts by weight of total epoxy will tend to reduce heat distortion temperatures of the cured resin system.

From about 2 to about 8 parts by weight, per 100 parts of total epoxy, of a curing agent, preferably a Lewis acid, is used. The term "Lewis acid" as used herein is meant to include Lewis acid and Lewis acid complexes such as Lewis acid amine complexes and Lewis acid alcoholate complexes, as is well known in the art. The usual Lewis acid is of the $BF_3$.is a bond amine type. One type found to be particularly useful is a mixture of $BF_3$.p-chloroaniline, plus p-chloroaniline and triethylene glycol. For a complete discussion of bisphenol A epoxy resins and Lewis acid curing agents, reference may be made to the *Handbook of Epoxy Resins*, by Lee and Neville, 1967 Chapters 2-3 to 2-9 and 5-13, herein incorporated by reference.

The next and critical ingredient is dibutylphosphite, which is added in the range of from about 0.3 to about 7 parts by weight per 100 parts of total epoxy. This material, within the range set forth, is critical in reducing high humidity thin film drying time, while still allowing good heat distortion temperatures. While we do not wish to be held to any particular theory, in this particular epoxy-Lewis acid system, it is believed that the dibutylphosphite acts as a nonthermally activated latent catalyst. In this function it may react with absorbed water to become an active polymerization catalyst. Also of definite advantage, the dibutylphosphite has a low toxicity. Addition of over about 7 parts by weight per 100 parts of total epoxy resin, heat distortion temperature will drop below about 100° C. and gel time will start to increase over 1 hour. Addition of less than about 0.3 parts by weight per 100 parts of total epoxy resin, thin film drying time at between 50% to 75% Relative Humidity will increase dramatically.

Dibutylphosphite is the only material found to be effective and useful in this specialized insulating and bracing system, to produce not only good heat distortion temperatures and gel times but also low thin film dry times at high humidity. Other materials, such as mono and diethylphosphates, dibutylphosphate, tributylphosphates, tricresylphosphates, and silica gel were found ineffective.

The porous, heat resistant substrate, into which the resin system is impregnated to provide the spacer is preferably a woven glass fiber, or fibrous felt material such as a Dacron (polyethylene terephthalate) pad. Any substrate material is useful, however, that is effective to allow resin impregnation, and compression and flexibility for insertion between conductors, while still resisting the heat of the environment into which it is placed. These substrate materials are usually about ¼ to ½ inch thick.

Referring now to the drawings, FIG. 1 shows one embodiment of a stator end-winding spacer system in an electrical apparatus. Support rings 10 are combined with resin impregnated spacers 11 and bonding tape 12 to control motion between insulated stator end windings 13 during generator operation. Coolant water inlets and outlets 14 are also shown.

Figure 2:
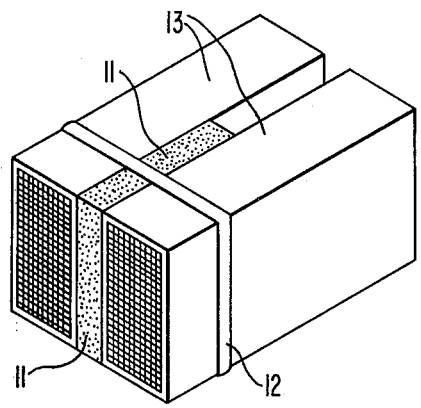
FIG. 2 shows an isometric view of a portion of FIG. 1 in section, to detail the spacers between the bound end windings.

The spacer 11 at, for example, position 15, in the end winding section or area of the generator, is shown in greater detail in FIG. 2. Here, the resin impregnated spacer is shown as a brace between a plurality of stator conductor coils in the end winding section of an electrical apparatus.

EXAMPLE

Several formulations were prepared for testing. A catalyzed base epoxy mixture was prepared containing: 95 parts by weight of a liquid diglycidyl ether of bisphenol A epoxy resin having an epoxy equivalent weight of from 172 to 176 and a viscosity at 25° C. of about 5,000 cps. (sold commercially by Dow Chemical Co. under the trade name DER 332); 5 parts by weight of diglycidyl ether of neopentyl glycol (DGENPG), having a viscosity at 25° C. of 5 to 25 cps., and 5 parts of a Lewis acid curing agent, consisting of 14 wt.% $BF_3$.p-chloroaniline complex, 10.5 wt.% p-chloroaniline and 75.5 wt.% triethylene glycol. The mixture of epoxy, i.e., DER 332 plus DGENPG had a viscosity at 25° C. of about 2,200 cps. To this admixture of epoxy and curing agent, the epoxy system, varying amounts of dibutylphosphite were added. In addition, other samples were made containing mono and diethylphosphates, dibutylphosphate, tributylphosphates, tricresylphosphates, and silica gel as comparative examples, as well as a control sample with no additive. Tests were run on all of the samples, and the results are shown in Table 1 below:

TABLE 1

| Sample* | Additive (parts/100 parts total epoxy) | Gel time minutes | Heat Distortion temp., °C. | 25°C. Thin Film Dry Time days at 50% RH | 65% RH | 75% RH |
|---|---|---|---|---|---|---|
| 1 | (0.5) Dibutylphosphite | 55 | 126 | 1 | 2 | 2.5 |
| 2 | (1.0) Dibutylphosphite | 57 | 123 | 0.5 | 1 | 2.0 |
| 3 | (2.0) Dibutylphosphite | 58 | 120 | 0.5 | 0.5 | 1.5 |
| 4 | (3.0) Dibutylphosphite | 59 | 116 | 0.5 | 0.5 | 0.5 |
| 5 | (4.2) Dibutylphosphite | 60 | 111 | 0.5 | 0.5 | 0.5 |
| **6 | (8.4) Dibutylphosphite | 68 | 90 | 0.5 | 0.5 | 0.5 |
| **7 | none | 54 | 128 | 9+ | 9+ | 9+ |
| **8 | (12.0) Silica Gel | — | — | 9+ | 9+ | 9+ |
| **9 | (4.2) 70 wt.% monoethylphosphate 30 wt.% diethylphosphate | 13 | 110 | 6.5 | 6.5 | 7 |
| **10 | (4.2) Dibutylphosphate | 18 | 110 | 4 | 4 | 4 |
| **11 | (4.2) Tributylphosphate | — | — | 4 | 6+ | 6+ |
| **12 | (4.2 Tricresylphosphate | — | — | 4 | 6+ | 6+ |

*Mixture of 95 parts DER 332, 5 parts DGENPG and 5 parts Lewis acid curing agent
**Comparative Sample As can be seen, the resin systems within the claim of this invention, Samples 1 through 5, exhibited good gel times, adequate heat distortion temperatures and outstanding thin film dry time at up to 75% Relative Humidity. Sample 6, outside the inventive range of dibutylphosphite showed heat distortion temperatures of below 100° C. All the other Samples had very high thin film dry times and in some instances too low a pot life gel time.

The preferred Sample of this invention, containing 4.2 parts of dibutylphosphite was impregnated into porous Dacron felt pads to provide resin impregnated spacers 1" wide × 4" long × ¼" thick. These wet, impregnated spacers were then forced into the gaps between coils similar to those found in the end winding region of turbine generators. During the insertion, a small quantity of the resinous impregnant exuded, forming a thin film of resin over a considerable area of the coils. This film soon gelled and completely dried. In addition, the resin in the impregnated Dacron felt soon gelled, hardened, and dried without apparent shrinkage to give strong, rigid, form-fit bracing spacers between the conductors. Such spacers would be excellent bracing blocks between stator coils in the end winding region of turbine generators. This resin is seen to present minimal toxicologic hazard and so can be easily handled and worked with.

The test methods employed for Table 1 were: Gel Time was measured as the time required for gellation of a 300 gram resin sample at 25° C. in a cylindrical container having a diameter of approximately 3 inches, and Heat Distortion Temperature was measured using a hemispherically tipped (0.030″ diameter) DuPont 941 Thermomechanical Analyzer Module, attached to a DuPont 900 Differential Thermal Analyzer Console, under a load of 85 grams, to simulate the force of 264 lb./sq.in. utilized in th ASTM D684-56 test for Heat Distortion. Thin Film Dry Time procedure utilized 0.006 inch thick resin films coated onto aluminum panels. The panels were suspended over a mixture containing a saturated aqueous solution of a variety of appropriate salts and excess solid salts in laboratory glass desiccators. We employed $Na_2Cr_2O_7$, $NaNO_2$ and $NaCl$ to obtain relative humidities of approximately 50%, 65%, and 75%, respectively at 25° C. The dry time, recorded to the nearest half day, was determined by the time required for the surface of the specimen to be dry to the touch.

What we claim is:

1. A resin impregnated spacer, useful for bracing electrical conductors, comprising a porous, flexible, heat resistant material impregnated with a resin consisting essentially of:
   (A) 100 parts by weight of an epoxy resin system having a viscosity at 25° C. of up to about 6,000 cps.,
   (B) about 2 parts by weight to about 8 parts by weight of a Lewis acid curing agent, and
   (C) about 0.3 parts by weight to about 7 parts by weight of dibutylphosphite, where said resin system can cure at room temperature.

2. The spacer of claim 1, where the epoxy resin system contains up to about 10 parts by weight of an epoxy resin having a viscosity of 25° C. of between about 5 cps. and 100 cps.

3. The spacer of claim 1, where the epoxy resin system comprises bisphenol A epoxy resin and up to about 10 parts by weight of a diglycidyl either of neopentyl glycol diluent.

4. The spacer of claim 1, where curing agent is a $BF_3$.amine complex, and the porous impregnated material is selected from the group consisting of polyethylene terephthalate, and woven glass fiber.

5. The spacer of claim 1, where the resin has a heat distortion temperature above 100° C., and can dry as a thin film at 25° C. within 36 hours at 75% Relative Humidity.

6. The spacer of claim 1, where the epoxy resin system consists essentially of a bisphenol A epoxy resin and up to about 10 parts by weight of a diglycidyl ether of neopentyl glycol diluent, the Lewis acid curing agent is a mixture of 14 wt.% $BF_3$.p-chloroaniline complex, 10.5 wt.% p-chloroaniline and 75.5 wt.% triethylene glycol, and the impregnated material is selected from the group consisting of polyethylene terephthalate, glass cloth, and fiber glass.

7. The spacer of claim 1, disposed as a brace between a plurality of electrical conductors.

8. The spacer of claim 1, cured in place between a plurality of electrical conductors.

9. An electrical apparatus having an end winding section containing a plurality of stator conductor coils having bracing spacers therebetween, the improvement comprising spacers which comprise a porous, flexible, heat resistant material impregnated with a resin consisting essentially of:
   (A) 100 parts by weight of an epoxy resin system having a viscosity at 25° C. of up to about 6,000 cps.,
   (B) about 2 parts by weight to about 8 parts by weight of a Lewis acid curing agent, and
   (C) about 0.3 parts by weight to about 7 parts by weight of dibutylphosphite.

10. A resin composition capable of curing at room temperature in a humid atmosphere, consisting essentially of:
    (A) 100 parts by weight of an epoxy resin system,
    (B) about 2 parts by weight to about 8 parts by weight of a curing agent, and
    (C) about 0.3 parts by weight to about 7 parts by weight of dibutylphosphite.

11. The resin of claim 10, where the epoxy resin system comprises bisphenol A epoxy resin and up to about 10 parts by weight of a reactive diluent epoxy resin having a viscosity at 25° C. of between about 5 cps. and 100 cps., where the epoxy resin system has a viscosity at 25° C. of up to about 6,000 cps., and where the curing agent is a Lewis acid.

12. The resin of claim 10, having the capability of drying as a thin film at 25° C. within 36 hours at 75% Relative Humidity.

* * * * *